United States Patent
Hiller et al.

(10) Patent No.: US 12,467,776 B2
(45) Date of Patent: Nov. 11, 2025

(54) METHOD AND HIGH-PRESSURE SYSTEM FOR DETERMINING A FLOW CONTROL VARIABLE OF A FLUID FLOW FLOWING THROUGH A HIGH-PRESSURE-SIDE HIGH-PRESSURE PUMP OUTLET OF A HIGH-PRESSURE PUMP

(71) Applicants: Uhde High Pressure Technologies GmbH, Hagen (DE); thyssenkrupp AG, Essen (DE)

(72) Inventors: Waldemar Hiller, Iserlohn (DE); Holger Werth, Unna (DE); Peter Nuennerich, Wilnsdorf (DE); Andrzej Karpinski, Hagen (DE)

(73) Assignees: Uhde High Pressure Technologies GmbH, Hagen (DE); thyssenkrupp AG, Essen (DE)

( * ) Notice: Subject to any disclaimer, the term of this patent is extended or adjusted under 35 U.S.C. 154(b) by 293 days.

(21) Appl. No.: 18/027,771

(22) PCT Filed: Sep. 10, 2021

(86) PCT No.: PCT/EP2021/074950
§ 371 (c)(1),
(2) Date: Mar. 22, 2023

(87) PCT Pub. No.: WO2022/063607
PCT Pub. Date: Mar. 31, 2022

(65) Prior Publication Data
US 2023/0358583 A1   Nov. 9, 2023

(30) Foreign Application Priority Data

Sep. 23, 2020  (BE) .................................. 2020/5652
Sep. 23, 2020  (DE) ..................... 10 2020 211 898.1

(51) Int. Cl.
*G01F 1/667*  (2022.01)
*F04B 23/04*  (2006.01)
(Continued)

(52) U.S. Cl.
CPC .............. *G01F 1/667* (2013.01); *F04B 23/04* (2013.01); *F04B 49/065* (2013.01);
(Continued)

(58) Field of Classification Search
CPC .......... G01F 1/667; G01F 15/022; G01F 1/66; F04B 23/04; F04B 49/065; F04B 2205/09
(Continued)

(56) References Cited

U.S. PATENT DOCUMENTS

| | | | |
|---|---|---|---|
| 7,624,651 B2 | 12/2009 | Fernald et al. | |
| 2011/0132103 A1* | 6/2011 | Gottlieb | G01F 1/662 |
| | | | 73/861.28 |

(Continued)

FOREIGN PATENT DOCUMENTS

| | | |
|---|---|---|
| CN | 100578191 C | 10/2007 |
| CN | 101074885 A | 11/2007 |

(Continued)

OTHER PUBLICATIONS

Parker Hannifin GmbH: "EO-Rohre für Fitting-& Flanschsysteme" (Oct. 2018).

(Continued)

*Primary Examiner* — Peter J Macchiarolo
*Assistant Examiner* — John M Royston
(74) *Attorney, Agent, or Firm* — thyssenkrupp North America, LLC

(57) ABSTRACT

A method and a high-pressure system for determining a flow control variable of a fluid flow flowing through a high-pressure-side high-pressure pump outlet of a high-pressure pump are provided. An externally arranged ultrasonic mea- (Continued)

suring device measures a flow speed of a fluid flow flowing through a pipe of the high-pressure-side high-pressure pump outlet. A use of an ultrasonic measuring device is provided for determining a flow value to be achieved of a fluid flow flowing through a thick-walled pipe. The ultrasonic measuring device is arranged on the outside on the thick-walled pipe of the high-pressure pump outlet. The pipe has a ratio of the internal diameter to the external diameter of 1:1.5 to 1:5. The ultrasonic measuring device dynamically measures the flow speed of the fluid flow and transmits this measured flow speed to an evaluation unit to compute a current flow value and the flow control variable.

13 Claims, 3 Drawing Sheets

(51) Int. Cl.
  *F04B 49/06* (2006.01)
  *G01F 1/66* (2022.01)
  *G01F 15/02* (2006.01)
(52) U.S. Cl.
  CPC ........ *G01F 15/022* (2013.01); *F04B 2205/09* (2013.01); *G01F 1/66* (2013.01)
(58) Field of Classification Search
  USPC .......................................................... 73/861
  See application file for complete search history.

(56) References Cited

U.S. PATENT DOCUMENTS

| | | | |
|---|---|---|---|
| 2017/0260820 A1 | 9/2017 | Sehsah | |
| 2020/0209026 A1* | 7/2020 | Hashimoto | ......... G01M 3/2807 |
| 2021/0356304 A1* | 11/2021 | Ishida | .................... G01F 1/7082 |
| 2022/0195856 A1* | 6/2022 | Bolt | ....................... F04B 49/225 |

FOREIGN PATENT DOCUMENTS

| | | | |
|---|---|---|---|
| CN | 104641118 A | 5/2015 | |
| DE | 10 2005 032636 A1 | 1/2007 | |
| DE | 10 2016 009179 A1 | 2/2018 | |
| DE | 10 2017 002297 A1 | 9/2018 | |
| DE | 10 2018 129220 A1 | 5/2020 | |
| EP | 3 273 205 A1 | 1/2018 | |
| WO | 2014/009016 A1 | 1/2014 | |
| WO | 2018/072926 A1 | 4/2018 | |
| WO | 2020/053572 A1 | 3/2020 | |
| WO | WO-2020104174 A1 * | 5/2020 | ............ F04B 49/065 |

OTHER PUBLICATIONS

English Translation of International Search Report issued in PCT/EP2021/074950, dated Dec. 3, 2021.
Hagedorn M. et al., "Praezisrohre fuer Hochdruck-Dieseleinspritzleitungen" (Precision Tubes for High-Pressure Diesel Injection Lines)—MTZ Motortechnische Zeitschrift, Springer, vol. 69, No. 3, pp. 200-205, English abstract attached (Mar. 1, 2008).

* cited by examiner

METHOD AND HIGH-PRESSURE SYSTEM FOR DETERMINING A FLOW CONTROL VARIABLE OF A FLUID FLOW FLOWING THROUGH A HIGH-PRESSURE-SIDE HIGH-PRESSURE PUMP OUTLET OF A HIGH-PRESSURE PUMP

CROSS REFERENCE TO RELATED APPLICATIONS

This application is a U.S. National Stage Entry of International Patent Application Serial Number PCT/EP2021/074950, filed Sep. 10, 2021, which claims priority to German Patent Application No. DE 10 2020 211 898.1, filed Dec. 6, 2021, and Belgian Patent Application No. BE 2020/5652, filed Dec. 6, 2021, the entire contents of all of which are incorporated herein by reference.

FIELD

The present disclosure generally relates to a method and a high-pressure system for determining a flow control variable of a fluid flow flowing through a high-pressure-side high-pressure pump outlet of a high-pressure pump.

BACKGROUND

Systems, for example chemical systems, have a complex interplay of substance and energy flows, which have to be monitored permanently, in particular to ensure the product quality, the operational safety, and the smooth operation of the system. It is fundamentally known that high demands are placed in particular on the measuring devices in high-pressure systems, due to the prevailing operating conditions. The organic and inorganic toxic and corrosive media often used and to be monitored with respect to their temperature, pressure, and/or flow speed, which are used in the system, can result in wear of the measuring devices and therefore in their measurement inaccuracy. Conventionally used instruments, such as apertures and other differential pressure meters, magnetic-inductive flowmeters, vortex meters, and Coriolis meters require frequent maintenance, which is accompanied by production interruptions. In addition, they cause a pressure loss in the line. Both of these reduce the availability of the system and its profitability.

In particular in high-pressure systems, for example high-pressure systems for polymerizing ethylene (ethene) or propylene (propene), the difficulty currently arises again and again of obtaining accurate and informative measurement results. This is because, on the one hand, in particular in high-pressure systems for polymerization or in the production of ethylene copolymers, the substances to be measured themselves represent the difficulty, since their flow rate (volume flow or mass flow) is very low and is only a few liters per hour. Moreover, high-pressure systems also cause a material density change due to the prevailing high pressure, by which the propagation speed of sound in the medium is significantly changed. The fluids to be monitored in the high-pressure systems are compressed in a known manner in so-called high-pressure pumps (e.g., high-pressure intensifiers, phased-flow pumps, crank drive pumps) to the required pressure, due to which a pressure pulsation arises as a resulting effect. This pulsating signal of the pumped medium (fluid) leads to undesired inaccuracies in the measurement result. In addition, these changes in pressure also cause changes in the geometry of the high-pressure lines of the high-pressure system. In particular the high-pressure pipes to be used, which have a small internal diameter and a correspondingly large wall thickness, make the measurement of the flow rate of initiator (peroxides) and comonomers, for example, significantly more difficult. Furthermore, the propagation speed of sound is also dependent on the tension states in the pipe material, i.e., it changes with the application of pressure.

In principle, using engagement-free measuring means, for example a clamp-on ultrasonic measuring device, in particular in low-pressure systems, is known, in order to enable a measurement by means of a low-maintenance and low-wear measuring means as mentioned above. The clamp-on ultrasonic measuring device is arranged externally on a part of the system, such as a piece of pipe of a pipeline system, and measures the speed of flowing liquids or gases (fluid) by means of the generally known ultrasonic runtime difference method. The ultrasonic runtime difference method is a technical method and is used to determine runtime differences between ultrasonic waves which pass through a fluid in opposite directions. Runtime differences arise here due to the deflection of the mechanically coupled ultrasonic waves, which arise due to a movement of the fluid. As a result, the runtime differences are used as the basis to determine the fluid speed, with the aid of which a statement about the volume flow and mass flow is first enabled (source: Flexim GmbH).

These ultrasonic measuring systems are only used in presently running high-pressure systems in such a way that in particular in high-pressure systems for polymerization or in the production of ethylene copolymers, the initiator to be introduced into the reactor or the comonomer is measured on the low-pressure side, in particular the suction side of the high-pressure pump. Often, only monitoring of the stroke number of the high-pressure pump also takes place to obtain a measurement result. However, this measurement result can only vaguely or approximately show the real volume flow of the fluid flowing in the reactor. Also only the final product itself is often checked, to be able to establish whether the amount of fluid metered into the reactor (initiator or comonomer) was optimal. If an undesired deviation from the SETPOINT state is then established, in the worst case destruction of the entire product patch is required, which is in turn connected to high production costs.

In the use case of, for example, waterjet cutting systems or high-pressure pasteurization plants, in which high-pressure pumps are used which can generate a water pressure up to 6000 bar, the flowing fluid is measured in a known manner up to only 4000 bar, however, by the high-pressure-side metering of the high-pressure pumps using turbine flowmeters permanently installed in the high-pressure lines.

A large number of applications of an ultrasonic measuring device, in particular in low-pressure systems or also modifications of ultrasonic measuring devices, as listed hereinafter, are known. A centrifugal pump assembly having a volume flow sensor is described in DE 10 2017 002 297 A1. The centrifugal pump assembly driven by an electric motor has a pump housing and a volume flow sensor for providing a volume flow value, which is installed in or on the pump housing, and is connected to a pump electronics unit for regulating the centrifugal pump assembly as a function of the volume flow value. The use of a clamp-on ultrasonic sensor for an ultrasonic flow meter is described in WO2018/072926A1. The clamp-on ultrasonic sensor is configured to generate at least one Lamb wave mode in a measurement pipe wall of a measurement pipe of the ultrasonic flow meter. To ensure a use of the clamp-on ultrasonic sensor on various measurement pipe types, the clamp-on ultrasonic sensor has an exchangeable coupling element, which is adapted to a respective measurement pipe type. A device for damping an undesired component of an ultrasonic signal is described in U.S. Pat. No. 7,624,651B2. The device has a sensor fastened on a pipe, which comprises a transmitter and a receiver. The transmitted ultrasonic signal contains a structural component which propagates through the pipe, and a liquid component, which propagates through a flow in the line. The device contains a damping structure, which damps the structural component of the ultrasonic signal and consists of a housing fastened on the pipe in order to modify the ultrasonic aberration properties. A measurement of a rheological property of a high polymer system is described in CN100578191C, wherein a tester is used to test the rheological properties of supercritical fluids and the ultrasonic irradiation on high-polymer systems and the influence of the properties on the molded product. A flowmeter for transmitting/receiving is described in CN 101074885B, which uses the state changes of a fluid to measure the propagation time.

The present disclosure provides an improvement over the above-described disadvantages in the measurement of a flow speed of a flowing fluid of a high-pressure system. A method and a high-pressure system for determining a flow control variable, is provided. The method and system is simple and cost-effective and enables an accurate measurement result of the volume flow (and/or mass flow) of the measured fluid, independently of the above-mentioned difficulties in the measuring method for measuring a fluid flow in high-pressure systems, and the determination of a value of a flow control variable for controlling the flowing fluid flow.

A method for determining a flow control variable of a fluid flow flowing through a high-pressure-side high-pressure pump outlet of a high-pressure pump is disclosed. Furthermore, the method disclosed herein discloses the use of an ultrasonic measuring device for determining a flow control variable of a fluid flow flowing through a thick-walled pipe of a high-pressure-side high-pressure pump outlet of a high-pressure pump. Features and details which are described in conjunction with the method according to the invention also apply in conjunction with the high-pressure system according to the invention, in particular in conjunction with the use of the ultrasonic measuring device and in each case vice versa, so that reference is or can always be made mutually with respect to the disclosure on the individual aspects of the invention. In addition, the method according to the invention can be carried out using the high-pressure system according to the invention.

DETAILED DESCRIPTION

Figure 1A:
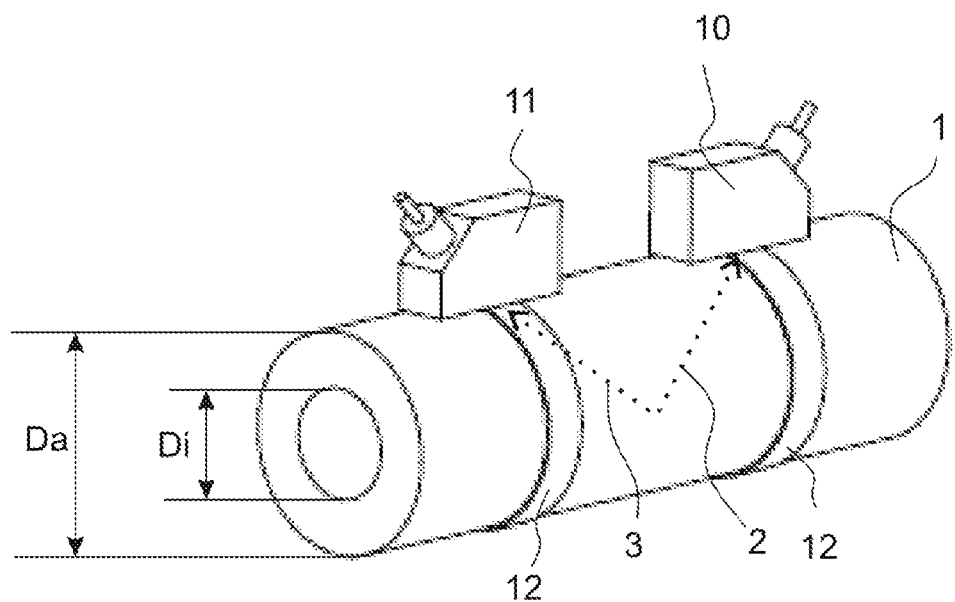
FIG. 1A is a perspective view of a detail of a thick-walled pipe having ultrasonic measuring devices arranged thereon in a series circuit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method and a high-pressure system for determining a flow control variable of a fluid flow flowing through a high-pressure-side high-pressure pump outlet of a high-pressure pump, in particular a fluid flow flowing through a high-pressure pipeline (high-pressure pipe) connected to the high-pressure-side high-pressure pump outlet of a high-pressure pump. Furthermore, the invention relates to a use of an ultrasonic measuring device for determining a flow control variable of a fluid flow flowing through a thick-walled pipe of a high-pressure-side high-pressure pump outlet of a high-pressure pump.

According to a first aspect of the invention, the method according to the invention is used to determine a flow control variable of a fluid flow flowing through a high-pressure-side high-pressure pump outlet of a high-pressure pump, having at least the following steps:

measuring the flow speed of the fluid flow flowing through a pipe (high-pressure pipe, high-pressure pipeline) of the high-pressure-side high-pressure pump outlet by means of at least one ultrasonic measuring device, in particular an externally arranged ultrasonic measuring device, to obtain a measurement result of the flow speed, transmitting the measurement result of the flow speed to an evaluation unit, and computing a present flow value and the flow control variable from the measurement result of the flow speed by means of the evaluation unit.

The ultrasonic measuring device used can be, for example, a clamp-on ultrasonic measuring device. This ultrasonic measuring device, which operates, for example, by means of an ultrasonic runtime difference method, advantageously offers a simple and rapid and also engagement-free installation option, since this ultrasonic measuring device will be/is arranged externally on the high-pressure pump outlet of the high-pressure pump used. It is also conceivable that a hybrid measuring method consisting of the runtime difference method and a noise trek method by means of the employed ultrasonic measuring device is used. The ultrasonic measuring device is therefore also capable of emitting corresponding noise trek signals as a hybrid measuring device. In this case, a stable measurement can take place with process reliability even in the case of a high gas and solid component in the fluid flow. A design modification of the existing system of the high-pressure system is not absolutely necessary due to the use or the attachment of the ultrasonic measuring device. It would advantageously be conceivable to design at least one inlet section before the measuring section and/or an outlet section after the measuring section in such a way that the measured fluid flow evens out. The measuring section advantageously refers here to the section of the pipe, in particular of the high-pressure pipe at the high-pressure-side high-pressure pump outlet, at which the at least one ultrasonic measuring device is arranged. It is also conceivable that at least two or more ultrasonic measuring devices, in particular a large number of ultrasonic measuring devices are arranged and aligned in relation to one another in a metrologically optimized manner in the area of the measuring section. The process taking place in the high-pressure system, for example the polymerization, is not influenced by the installation of the ultrasonic measuring device and its use. Furthermore, the ultrasonic measuring device used enables essentially wear-free application, since the ultrasonic measuring device does not come into contact with the fluids to be measured and monitored, which can partially also be toxic. A possibly occurring risk of leaking is also minimized, advantageously even avoided entirely, by the use of an ultrasonic measuring device. This is required in particular for high-pressure systems in explosive surroundings, in which the entire measuring device has to meet the specifications for explosion protection. It is also to be mentioned as advantageous that no additional pressure loss in the high-pressure line system is to be registered even during the use of the ultrasonic measuring device.

Moreover, it is conceivable to enable a multipath arrangement and/or a series arrangement of ultrasonic measuring devices, by which the measurement accuracy can advantageously be increased further and influencing due to an asymmetrical flow profile can be minimized. More precisely, this means that, for example, two or more ultrasonic measuring devices are arranged (within the measuring section) in succession in the flow direction at identical circumferential position of the pipe (high-pressure pipe), in particular on the same side of the pipe. In this case, the signal emitted by a first ultrasonic measuring device can be reflected on an inner wall of the pipe and received by the other ultrasonic measuring device arranged adjacent, and vice versa. In this case, reference is made to a reflection mode in which the number of the sound paths is even or corresponds to an even number. The first sound path is therefore the path between the emitting ultrasonic measuring device and the inner wall of the pipe, while the second sound path is the path between the inner wall of the pipe and the receiving ultrasonic measuring device. Alternatively or additionally, it is conceivable that, for each ultrasonic measuring device, an ultrasonic measuring device arranged on the opposite side of the pipe (high-pressure pipe) is oriented to receive signals or transmit signals. This is a transmission mode, in which the number of the sound paths is odd or corresponds to an odd number. Therefore, if the one ultrasonic measuring device transmits a signal through the pipe to its ultrasonic device located essentially opposite, this is a single sound path. When the number of the sound paths is increased, the accuracy of the measurement also increases, wherein the signal damping increases at the same time, however.

The flow control variable, which can also be referred to as a flow control value in the scope of the invention, represents a value "x". This value "x" defines the deviation between an ACTUAL value, more precisely the measured flow value, in particular the measured flow speed, and the SETPOINT value, more precisely the defined required flow value, in particular the required flow speed over the time "t". Accordingly, "ACTUAL*x=SETPOINT". More precisely, a value is determined by the determination of the value "x", thus the flow control variable, which equalizes the difference between the measured ACTUAL value and the required SETPOINT value. The required SETPOINT value, more precisely the defined or established flow value, is advantageously a varying variable, which can be changed and adapted depending on the requirements and conditions of the high-pressure system. The SETPOINT value specifications are established, for example, by the high-pressure system operator. The SETPOINT values are advantageously stored in a memory unit of an evaluation unit and can be queried or retrieved for individual operating modes of the high-pressure system.

The method according to the invention is used in particular to measure fluids used in the area of the high-pressure areas of application presented hereinafter, wherein the invention is not restricted to these areas of application. Rather, these presented areas of application are to be understood as examples.

A first area of application is the polymerization of polyethylene carried out in a high-pressure system. In this process, pressures in the range of 1000-3500 bar are generated, at which initiators, such as peroxides, are introduced into the reactor. Among other things, it is a goal in this case to optimize the amount of the introduced initiator in the process steadily, in particular continuously, with regard to the production amount and the system safety. In particular, an inadvertently excessive amount of initiator increases the risk of undesired sudden decomposition of the ethylene, which in turn results in a strong exothermic reaction and therefore shutdown of the entire high-pressure system. The necessity results therefrom of an accurate measurement of the initiator flow before the reactor, thus directly before the introduction of the initiator flow into the reactor. The metered initiator amount, in particular the metered peroxide amount and accordingly also the initiator losses, can be measured by means of the present invention on the high-pressure side, thus on the high-pressure-side high-pressure pump outlet of the high-pressure pump. Initiator losses arise, for example, due to leaks at worn high-pressure seals.

A further area of application is the production of ethylene copolymers. In this process, comonomers, such as vinyl acetate, methyl acrylate, or butyl acrylate are metered by means of high-pressure pumps into the reactor. The injection of comonomers to the ethylene takes place before or directly in the reactor. Since ethylene copolymers are modern, high-quality plastic products, accurate measurement of the comonomer flow before the reactor and also its manual, semiautomatic, preferably fully automatic dynamic control is of immense importance.

A further area of application is waterjet cutting systems or high-pressure pasteurization plants (HPP), in which high-pressure pumps are used which can generate water pressures up to 6000 bar. Engagement-free measurement of the water volume at pressures up to 6000 bar is highly relevant for these high-pressure systems for inspection and test purposes and for the advantageous automatic detection of water leaks and nozzle clogs during operation.

The flow speed of the fluid used, which is determined or measured by means of the ultrasonic measuring device, and which can in particular be understood as the mean flow speed and can also be designated as the flow velocity, is transmitted by the ultrasonic measuring device as a measurement result to an evaluation unit. This evaluation unit is used to compute a present flow value, such as a volume flow (dV/dt or V). This volume flow can advantageously be converted by means of the fluid density into a mass flow (dm/dt or m). The present flow value (volume flow, mass flow) therefore displays the presently measured ACTUAL condition to the operator of the high-pressure system. This means that in the event of a query of the evaluation unit with respect to the present flow value at a measurement point, such as the high-pressure-side high-pressure pump outlet here, the operator has the presently prevailing volume flow or also mass flow communicated. This value can change continuously, since the measurement of the flow speed also takes place continuously, in particular dynamically. The evaluation unit has a display element, such as a display screen, a display panel, etc., to display at least the present flow value and also the flow control variable. In consideration of the present/instantaneous flow value, the determination of the flow control variable is carried out by means of the evaluation unit. The flow control variable is in particular a value which is required to obtain a flow value to be achieved/reached. This means that the flow control variable or the flow control value is a factor which is required to enable a volume flow or mass flow to be achieved, ultimately a flow speed or flow velocity of the fluid to be achieved, which should/must be introduced into the reactor in order to obtain the result to be expected. The flow control value or the flow control variable is accordingly a regulating and control value, using which it is specified (back-calculated) to what extent the flow speed of the fluid flowing through the high-pressure-side high-pressure pump outlet has to be increased or reduced so that the present flow value remains within predetermined limiting values. The predetermined limiting values are established with regard to the final product to be achieved and enable the introduction of a predetermined amount of fluid that meets requirements into the reactor.

According to one embodiment, the measurement of the flow speed and the transmission of the measurement result and the computation of the present flow value and the flow control variable take place dynamically. This means that the ultrasonic measuring device continuously detects/measures the flow speed and therefore also transmits it continuously to the evaluation unit as a measurement result. This evaluation unit then in turn continuously determines from this measurement result the present flow value, in particular the present volume flow or mass flow, and a flow control variable, in particular a flow control value. The control/regulation of the high-pressure pump taking place thereupon also takes place dynamically.

According to a further embodiment, the evaluation unit computes the present flow value by means of an equation method, that is to say by means of a mathematical computation method using an equation or formula and/or the flow control variable by means of a comparison method. As the present flow value, for example, the volume flow is computed as the product of the pipe cross section, on which the ultrasonic measuring device is arranged, and the measured flow speed (flow velocity). The evaluation unit, in particular its computing unit, which is a component of the evaluation unit, advantageously computes a present mass flow as the product of the previously computed/determined volume flow and a fluid density. The present flow value obtained, which can also be designated as the ACTUAL flow value (ACTUAL VALUE), is then advantageously compared in a comparison method to a SETPOINT flow value (SETPOINT VALUE), in particular a minimum SETPOINT flow value and a maximum SETPOINT flow value. For this purpose, the evaluation unit has, for example, a comparison unit, which is a component of the evaluation unit, in particular is a component of the computing unit. If the ACTUAL flow value is greater than or equal to the minimum SETPOINT flow value and less than or equal to the maximum SETPOINT flow value, no control of the process takes place, in particular no control of the high-pressure pump. However, if the ACTUAL flow value is less than the minimum SETPOINT flow value or greater than the maximum SETPOINT flow value, a control of the process is necessary. For this purpose, the evaluation unit determines the degree of deviation, in particular the flow control variable or the flow control value of the ACTUAL flow value in relation to the minimum or maximum setpoint flow value, preferably via an equation. The computing unit is again used for this purpose, in particular a deviation determination unit of the evaluation unit. The degree of deviation, in particular the flow control variable or the flow control value, specifies how much additional fluid has to be introduced into the reactor or how much less fluid has to be introduced into the reactor. It is therefore determined via this flow control variable whether the flow speed of the high-pressure pump has to be increased or decreased. The high-pressure pump is then activated either manually (by an operator), semiautomatically, advantageously (fully) automatically by final control elements, in order to regulate and control the high-pressure pump in accordance with the result of the flow control variable. For this purpose, the evaluation unit is advantageously connected to transmit data in a wired or wireless manner to the at least one final control element on the high-pressure pump. The process of measuring, computing, and controlling/regulating is a dynamic process which is therefore carried out continuously during the operation of the high-pressure system, so that the high-pressure pump can also advantageously be continuously regulated as needed.

In a further embodiment, the flow speed measured by means of the ultrasonic measuring device is corrected in consideration of further provided or determined information data such as a temperature of the fluid flow and/or a pressure of the fluid flow, wherein the mathematical relationships required for this purpose and factors possibly required are determined theoretically or empirically. Further sensors advantageously arranged on the measuring section, such as temperature sensors and/or pressure sensors, etc., can be useful in this case, for example. These sensors are also advantageously connected to the evaluation unit in order to transmit the determined data thereto.

As a further aspect of the invention, a high-pressure system is claimed, which has a high-pressure pump having a high-pressure pump inlet and a high-pressure-side high-pressure pump outlet. At least one ultrasonic measuring device, in particular an externally arranged ultrasonic measuring device, is arranged at the high-pressure-side high-pressure pump outlet to measure a flow speed of a fluid flow flowing through a pipe of the high-pressure-side high-pressure pump outlet. In particular, the at least one ultrasonic measuring device is arranged on the outside on the pipe (high-pressure pipe) of the high-pressure-side high-pressure pump outlet. The at least one ultrasonic measuring device is particularly advantageously arranged within a measuring section on the pipe (high-pressure pipe) of the high-pressure-side high-pressure pump outlet. The pipe (high-pressure pipe) can be part of the high-pressure-side high-pressure pump outlet or can be connected thereto, in particular operationally connected. It is advantageously thus possible to determine the volume flow or also mass flow of the flowing fluid leaving the high-pressure pump and therefore flowing into the reactor, in order to regulate it, in particular the flow speed of the fluid flowing through the high-pressure pump outlet. The high-pressure system can be in this case a high-pressure system as described above for polymerizing ethylene and propylene or ethylene and comonomers, or a waterjet cutting system or also a high-pressure pasteurization plant.

According to one embodiment, the high-pressure-side high-pressure pump outlet has a thick-walled pipe having a ratio of the pipe internal diameter to the pipe external diameter of 1:1.5 to 1:5, wherein the ultrasonic measuring device is arranged on the outside on this thick-walled pipe. This thick-walled pipe is conceived in particular for use in high-pressure systems and has a comparatively small pipe internal diameter in relation to the comparatively large pipe external diameter, so that its wall thickness is much thicker/greater than in commercially-available pipes in conventional systems. This pipe can be processed particularly carefully on the inner and/or outer surface, so that a very fine surface is obtained and/or the geometry has particularly close tolerances.

It is conceivable that the system has a reactor chamber (reactor) for carrying out a chemical, thermal, thermodynamic, or mechanical reaction and the thick-walled pipe is arranged directly or indirectly between the reactor chamber and the high-pressure pump. This means that the thick-walled pipe is connected to or arranged on the high-pressure pump either directly (immediately) without another element or part interconnected or indirectly (non-directly), thus via an intermediate element or intermediate part. The thick-walled pipe can be arranged at the high-pressure-side high-pressure pump outlet or can be part of the high-pressure-side high-pressure pump outlet.

According to one embodiment of the invention, the high-pressure system is a system for polymerizing monomers, in particular ethene (ethylene) and propene (propylene).

According to a further embodiment, the thick-walled pipe comprises a material made of the group of metal alloys, such as high-alloyed or low-alloyed steels, titanium alloys, copper alloys, nickel alloys, tantalum alloys, chromium alloys, or cobalt alloys. The thick-walled pipe is therefore advantageously resistant to corrosive media and resistant to high pressure. A deformation of the thick-walled pipe is substantially avoided, advantageously prevented due to the materials used. It is also conceivable that the thick-walled pipe comprises a mixture of the above-mentioned metal alloys. Moreover, the thick-walled pipe is not limited to these metal alloys.

It is furthermore conceivable that the thick-walled pipe (high-pressure pipe) is fixed by means of a flange on the high-pressure pump, which flange has a flow channel having a section continuously conically enlarging at least in sections—in the flow direction—wherein this conical section extends over at least a third, in particular over half of the total length of the flow channel. Due to the above-described geometry of the flow channel of the flange, a soft transition from the high-pressure-side high-pressure pump outlet to the thick-walled pipe is advantageously enabled. This enables advantageously optimized flow conditions of the fluid coming from the high-pressure pump and flowing through the flange and the thick-walled pipe.

According to a further embodiment, the internal diameter of the thick-walled pipe has a section continuously enlarging at least in sections, a cylindrical section, and a section continuously tapering at least in sections. All three sections are advantageously arranged adjacent to one another in such a way that in the flow direction first the section continuously enlarging at least in sections, then the cylindrical section, and then the section continuously tapering at least in sections are formed. The sections advantageously open into one another in such a way that the first section opens into the next (second) section and the next (second) section opens into the following (third) section. The flow conditions of the fluid flow flowing through are advantageously evened out hereby in such a way that an essentially uniform, usually turbulent fluid flow results. The measurement signal is advantageously more consistent and lower-noise in this way.

According to a further embodiment, a straight, in particular curve-free calming section having a length which corresponds to at least five times the internal diameter (pipe internal diameter) of the thick-walled pipe is formed before the ultrasonic measuring device in the flow direction, and a straight, in particular curve-free calming section having a length which corresponds to at least three times the internal diameter (pipe internal diameter) of the thick-walled pipe, is formed after the ultrasonic measuring device in the flow direction. The calming sections are advantageously pieces of pipe, in particular linearly formed pieces of pipe or pipes. These pipes (calming pipes/calming pieces of pipe) are advantageously arranged before and after the thick-walled pipe (high-pressure pipe) of the high-pressure-side high-pressure pump outlet and are connected/operationally connected thereto. Alternatively, the calming sections are sections of the thick-walled pipe (high-pressure pipe) of the high-pressure-side high-pressure pump outlet. The calming sections are then advantageously formed before and after the measuring section, which is also a section of the thick-walled pipe. The calming sections (as independent pieces of pipe or as sections of a common thick-walled high-pressure pipe) can each have a uniformly extending internal diameter or also an internal diameter tapering or expanding viewed in the flow direction. It is also conceivable that the one calming section has a smaller/larger internal diameter than the other calming section. The calming sections are predominantly used to even out the fluid flow and enable an accurate measurement with process reliability.

It is furthermore possible that the fluid flow consists of a fluid comprising a chemical initiator, in particular peroxide, or a comonomer, in particular vinyl acetate, methyl acetate, or butyl acetate, or another liquid. This list is not to be viewed as exhaustive, however. Other fluids can also be part of the fluid flow here.

It is also conceivable that the high-pressure pump is designed to generate a pressure between 1000 and 6000 bar. A large number of areas of application in high-pressure systems are thus advantageously implementable.

According to a further embodiment, the ultrasonic measuring device is connected to an evaluation unit to transmit signals or transmit data, in order to transmit the measurement result of the flow speed of the fluid flow to the evaluation unit. The transmission of data and signals can take place in a wireless or wired manner here. The evaluation unit itself has a large number of further units, such as a display unit for displaying the determined/measured, computed, and controlled/regulated data and/or a possible input unit for inputting or for changing data and parameters. A computing unit, a deviation determination unit, and/or a comparison unit are also conceivable units, wherein the computing unit computes flow values to be determined from the measurement result, the comparison unit compares the computed values to SETPOINT specifications, and the deviation determination unit evaluates the result with respect to the setpoint specifications (deviations/degree of deviation/flow control variable). Transmitting and receiving units for transmitting data are also helpful and are advantageously part of the evaluation unit. A preferably (fully) automatic collection and computation of data and (fully) automatic control of the high-pressure pump with respect to at least its parameters of the flow speed can advantageously be carried out dynamically using the evaluation unit.

The high-pressure system accordingly also advantageously has control and regulating units which are used to control or regulate the volume flow/mass flow of the fluid as needed. These control and regulating units are advantageously arranged-viewed in the flow direction-before the ultrasonic measuring device, in particular before the calming section.

With the high-pressure system described, all advantages result which have already been described for a method for determining a flow control variable according to the first aspect of the invention.

A use of an ultrasonic measuring device for determining a (present/instantaneous) flow value of a fluid flow flowing through a thick-walled pipe of a high-pressure-side high-pressure pump outlet of a high-pressure pump is claimed as a further aspect of the invention. In that respect, the ultrasonic measuring device is arranged externally on the thick-walled pipe of the high-pressure pump outlet, which pipe has a ratio of the internal diameter (pipe internal diameter) to the external diameter (pipe external diameter) of 1:1.5 to 1:5. This ultrasonic measuring device measures the (present) flow speed of the fluid flow dynamically and this measured flow speed is then transmitted (also dynamically) as a measurement result to an evaluation unit to compute a present flow value and a flow control variable or a flow control value from the measurement result.

With the described use, all advantages result which have already been described for a method for determining a flow control variable according to the first aspect of the invention and for the high-pressure system according to the second aspect of the invention.

It is apparent that the above-mentioned features and the features still to be explained hereinafter are usable not only in the respective specified combination, but also in other combinations or alone, without leaving the scope of the present invention.

Elements having identical function and mode of action are each provided with the same reference signs in FIGS. 1 to 4.

Figure 1B:
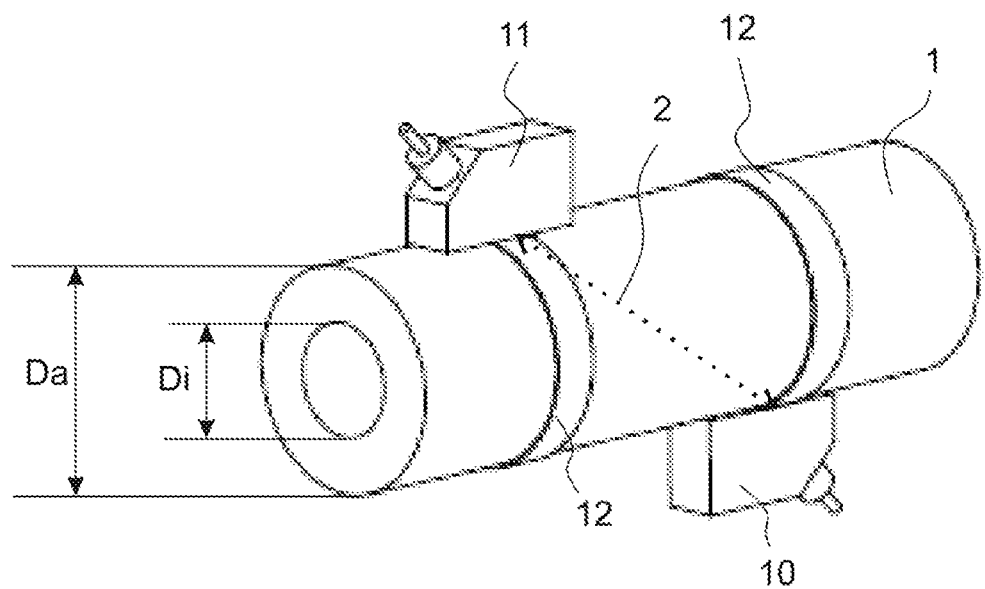
FIG. 1B is a perspective view of a detail of a thick-walled pipe having ultrasonic measuring devices arranged thereon in a parallel circuit.

FIGS. 1A and 1B each schematically show a perspective view of a detail of a thick-walled pipe 1 having ultrasonic measuring devices 10, 11 arranged thereon. In the embodiment shown in FIG. 1A, the ultrasonic measuring devices 10, 11 are arranged in a series circuit. This means that both ultrasonic measuring devices 10, 11 are fastened on the same side of the pipe 1. This arrangement of the ultrasonic measuring devices 10, 11 is suitable in particular for using a reflection mode and for generating an even number of sound paths 2, 3. As schematically shown in FIG. 1A, two sound paths 2, 3 (dotted line), namely a first sound path 2 between the one (first) ultrasonic measuring device 10 and the inner wall of the pipe 1 and an associated (second) sound path 3, in particular connected to the first sound path 2, between the inner wall of the pipe 1 and the further (second) ultrasonic measuring device 11. Since the further ultrasonic measuring device 11 also emits signals, in particular ultrasonic waves, the two sound paths 2, 3 are therefore also used thereby, wherein therefore, however, the signals/soundwaves run opposite to the first signals/soundwaves. In the embodiment according to FIG. 1B, the ultrasonic measuring devices 10, 11 are essentially arranged in a parallel circuit. This means that the ultrasonic measuring devices 10, 11 are arranged on opposite sides of the pipe 1. The ultrasonic measuring devices 10, 11 have, viewed in the flow direction, a distance offset in relation to one another, therefore are not directly opposite to one another. Rather, the ultrasonic measuring devices 10, 11 are arranged spaced apart from one another viewed in the flow direction. This arrangement of the ultrasonic measuring devices 10, 11 is advantageously suitable for the use of the transmission mode, in which an odd number of sound paths 2 is generated. As is apparent in FIG. 1B, one sound path 2 is generated between the one (first) ultrasonic measuring device 10 and the other (second) ultrasonic measuring device 11. The soundwaves originating from the ultrasonic measuring devices 10, 11 are therefore not reflected on the inner surface of the pipe 1, rather penetrate the pipe 1 from one side to the other side.

As shown in FIGS. 1A and 1B, the ultrasonic measuring devices 10, 11 are arranged on the exterior/outside on the thick-walled pipe 1 and are each fixed by means of a fastening element 12, a fastening belt here, for example. The thick-walled pipe 1 has an internal diameter Di and an external diameter Da. Both ultrasonic measuring devices 10, 11 dynamically measure the flow speed of the flowing fluid and transmit the measurement results continuously to an evaluation unit 50, as schematically shown in FIG. 2.

Figure 2:
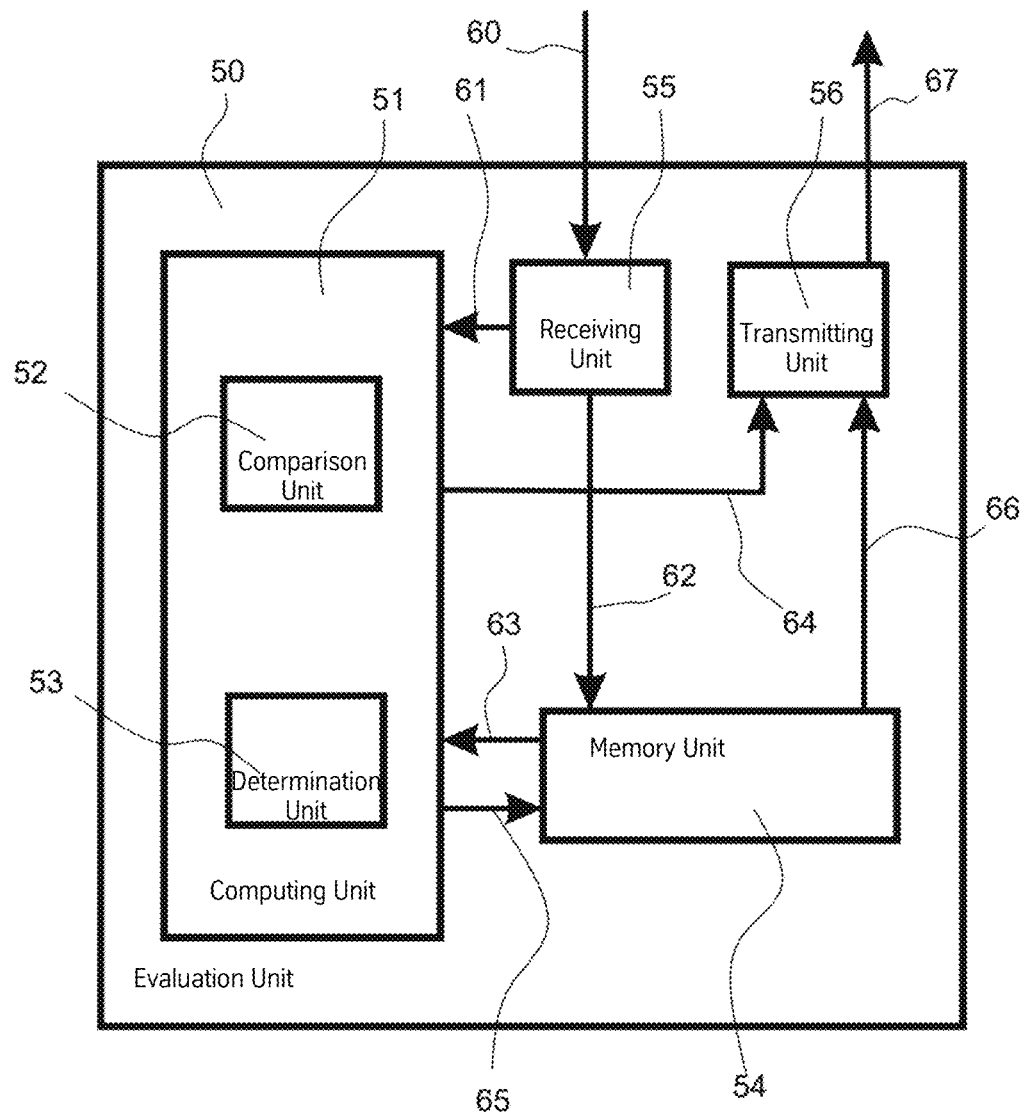
FIG. 2 is a schematic illustration of an embodiment of an evaluation unit.

The evaluation unit 50 schematically shown in FIG. 2 advantageously has a large number of units. By means of the receiving unit 55, the evaluation unit 50 therefore receives the measured values (arrow 60) transmitted by the ultrasonic measuring devices 10, 11 with respect to the flow speed or flow velocity of the fluid flowing through the thick-walled pipe 1 (cf. FIG. 1). The received data/values are then passed on either directly, thus directly to a computing unit 51 (arrow 61), or transmitted non-directly, thus indirectly first to a memory unit 54 (arrow 62) and then via this memory unit 54, which is used, inter alia, for temporarily storing the data, to the computing unit 51 (arrow 63). The computing unit 51 determines from the presently sent data a present flow value, such as a volume flow and/or mass flow. This determined present flow value is then passed on to the comparison unit 52, which is a part of the computing unit 51. The comparison unit 52 compares the received flow value to predetermined minimum SETPOINT flow values and maximum SETPOINT flow values. The result is then transmitted to a deviation determination unit 53, which is also advantageously a part of the computing unit 51. The deviation determination unit 53 determines the manipulated variable, in particular the flow control variable or the flow control value, which it requires to regulate the high-pressure pump in such a way that the measured flow speed and the flow value to be determined therefrom are within predetermined limiting values. These values/data are then transmitted either directly (immediately) in the form of command data to a transmitting unit 56 (arrow 64) or non-directly (indirectly) via the above-mentioned memory unit 54 (arrow 65 and arrow 66). The transmitting unit 56 then transmits the data or manipulated variables, in particular the flow control variable or the flow control value, on to final control elements (not shown here) (regulating and control units) of the high-pressure pump (arrow 67). These final control elements then ensure a demand-controlled regulation of the high-pressure pump.

Figure 3:
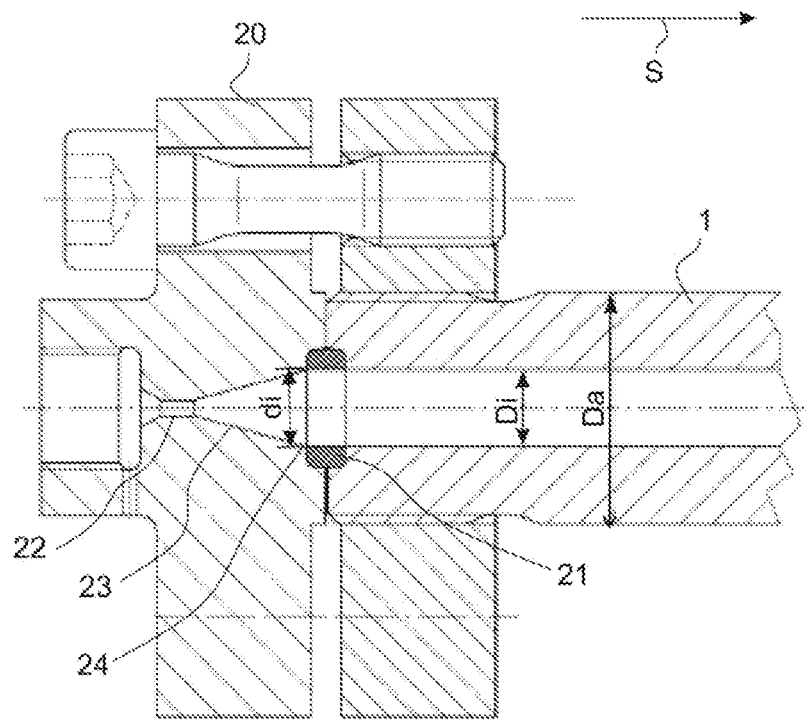
FIG. 3 is a sectional illustration of an embodiment of a thick-walled pipe having a flange to be arranged on a high-pressure-side high-pressure pump outlet.

FIG. 3 shows a sectional illustration of an embodiment of a thick-walled pipe 1 having a flange 20 to be arranged on a high-pressure-side high-pressure pump outlet (not shown here). The thick-walled pipe 1 was arranged leak-tight on the flange 20 using suitable seal elements 21 and has an internal diameter Di and an external diameter Da. The flange 20 has a flow channel 22, which extends starting from the high-pressure-side high-pressure pump outlet (not shown here) to the thick-walled pipe 1. The flow channel 22 has a conical section 23, which in particular continuously conically enlarges in the flow direction S. The distal end 24 of the flow channel 22, which is oriented toward the thick-walled pipe 1, advantageously has an internal diameter di which corresponds to at least two-thirds of the internal diameter Di or the pipe internal diameter Di of the thick-walled pipe 1. The internal diameter di of the flow channel 22 is advantageously equal to the internal diameter Di of the thick-walled pipe 1.

Figure 4:
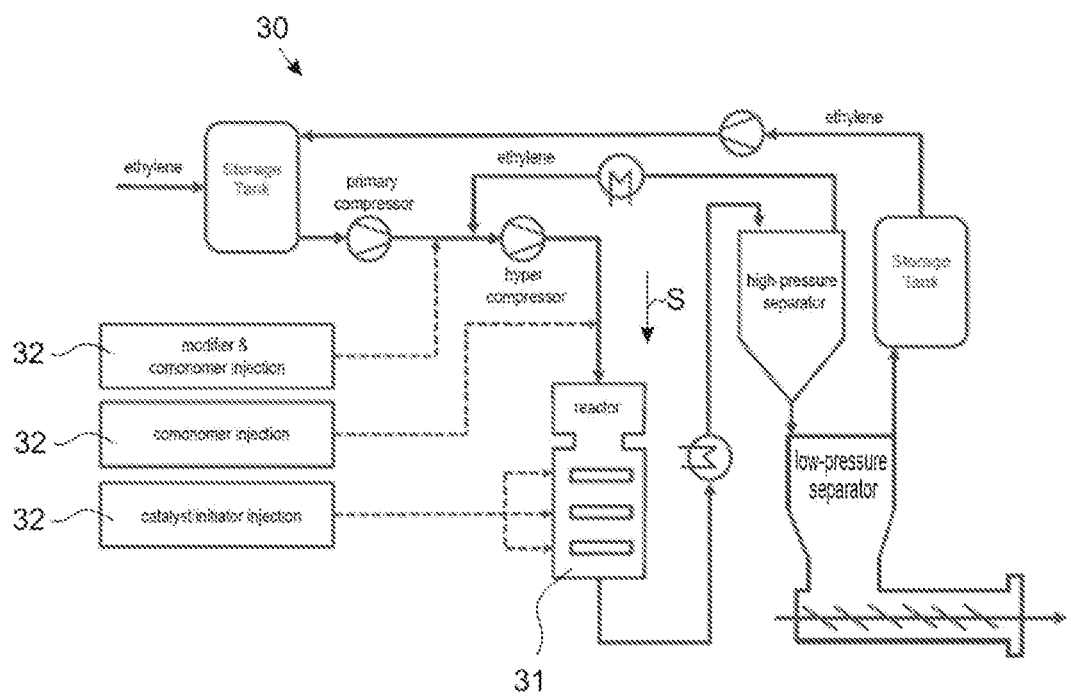
FIG. 4 is a circuit diagram of an embodiment of a high-pressure system.

FIG. 4 schematically shows a circuit diagram of a high-pressure system 30. This is primarily a high-pressure system for producing ethylene copolymers in the reactor 31, which can advantageously be designed as a stirring reactor. Alternatively, it is conceivable that the high-pressure system 30 shown in FIG. 4 has a pipe reactor. Ethylene and/or propylene is/are compressed via the compressors (primary compressor, hyper compressor) and pumped into the reactor 31. The flow direction S results here. Before the reactor 31, thus viewed opposite to the flow direction S, the possible high-pressure pumps 32 are arranged, which are connected in particular via their high-pressure-side high-pressure pump outlet to the reactor 31. These high-pressure pumps 32 are advantageously used to pump in initiators (sometimes also referred to as catalysts, peroxides), modifiers, and/or comonomers. In addition, the high-pressure pumps 32 are advantageously used as control elements (regulating and control units) in the high-pressure system 30, since the amount of fluid pumped in influences the polymerization process, and sometimes also first initiates it. Among other things, the temperature and the degree of polymerization are regulated, and the quality of the produced plastic is therefore decisively influenced, by precise metering of the fluids to the high-pressure medium.

LIST OF REFERENCE SIGNS 1 thick-walled pipe
2 (first) sound path
3 (second) sound path
10, 11 ultrasonic measuring device
20 flange
21 seal element
22 flow channel
23 continuously conically enlarging section
24 distal end
30 high-pressure system
31a, b reactor/reactor chamber
32 high-pressure pump
50 evaluation unit
51 computing unit
52 comparison unit
53 deviation determination unit
54 memory unit
55 receiving unit
56 transmitting unit
60 input of the measured values
61 transmission of the measured values to computing unit
62 transmission of the measured values to memory unit
63 transmission of the measured values to computing unit
64 transmission of the command data to transmitting unit
65 transmission of the command data to memory unit
66 transmission of the command data to transmitting unit
67 transmission of the command data to final control elements
Da external diameter of thick-walled pipe/pipe external diameter
Di internal diameter of thick-walled pipe/pipe internal diameter
di internal diameter of flow channel
S flow direction

What is claimed is:

1. A method for determining a flow control variable of a fluid flow flowing through a high-pressure-side high-pressure pump outlet of a high-pressure pump, the high pressure pump designed to generate a pressure between 1000 and 6000 bar, the method comprising:
    measuring a flow speed of the fluid flow flowing through a pipe of the high-pressure-side high-pressure pump outlet by means of at least one ultrasonic measuring device including an externally arranged ultrasonic measuring device, to obtain a measurement result of the flow speed, wherein the high-pressure-side high-pressure pump outlet is a thick-walled pipe having a ratio of the pipe internal diameter to the pipe external diameter of 1:1.5 to 1:5 and the ultrasonic measuring device is arranged on the outside on this thick-walled pipe;
    transmitting the measurement result of the flow speed to an evaluation unit; and
    computing a present flow value and the flow control variable from the measurement result of the flow speed by means of the evaluation unit.

2. The method as claimed in claim 1, wherein the measurement of the flow speed and the transmission of the measurement result and the computation of the present flow value and the flow control variable to be achieved take place dynamically.

3. The method as claimed in claim 2 wherein the evaluation unit computes at least one of the present flow value by means of an equation method and the flow control variable by means of a comparison method.

4. The method as claimed in claim 3 wherein the flow speed measured by means of the ultrasonic measuring device is corrected in consideration of further provided or determined information data, including at least one of a temperature of the fluid flow and a pressure of the fluid flow, wherein the mathematical relationships required for this purpose are determined theoretically or empirically.

5. A high-pressure system, comprising:
    a high-pressure pump having a high-pressure pump inlet and a high-pressure-side high-pressure pump outlet, the high pressure pump designed to generate a pressure between 1000 and 6000 bar, wherein the high-pressure-side high-pressure pump outlet is a thick-walled pipe having a ratio of the pipe internal diameter to the pipe external diameter of 1:1.5 to 1:5; and
    at least one ultrasonic measuring device including an externally arranged ultrasonic measuring device that is externally arranged on the high-pressure-side high-pressure pump outlet and on the thick-walled pipe to measure a flow speed of a fluid flow flowing through the thick-walled pipe of the high-pressure-side high-pressure pump outlet.

6. The high-pressure system as claimed in claim 5 wherein the high-pressure system has a reactor chamber for carrying out a chemical, thermal, thermodynamic, or mechanical reaction and the thick-walled pipe that is arranged directly or indirectly between the reactor chamber and the high-pressure pump.

7. The high-pressure system as claimed in claim 6 wherein the high-pressure system is a system for polymerizing monomers, in particular ethene (ethylene) and propene (propylene).

8. The high-pressure system as claimed in claim 7 wherein the thick-walled pipe comprises a material from the group of metal alloys, such as high-alloyed or low-alloyed steels, titanium alloys, copper alloys, nickel alloys, tantalum alloys, chromium alloys, or cobalt alloys.

9. The high-pressure system as claimed in claim 8 wherein the thick-walled pipe is fixed by means of a flange on the high-pressure pump, which flange has a flow channel having a continuously conically enlarging section, wherein this conical section extends at least over a third, in particular over half of the total length of the flow channel.

10. The high-pressure system as claimed in claim 9 wherein the internal diameter of the thick-walled pipe has a section continuously enlarging, a cylindrical section, and a section continuously tapering.

11. The high-pressure system as claimed in claim 10 wherein in the flow direction before the ultrasonic measuring device, a straight, curve-free calming section having a length which corresponds to at least five times the internal diameter of the thick-walled pipe is formed, and, in the flow direction after the ultrasonic measuring device, a straight, curve-free calming section having a length which corresponds to at least three times the internal diameter (Di) of the thick-walled pipe are formed.

12. The high-pressure system as claimed in claim 11 wherein the ultrasonic measuring device is connected to an evaluation unit to transmit signals, in order to transmit the measurement result of the flow speed of the fluid flow to the evaluation unit.

13. A use of an ultrasonic measuring device for determining a flow value of a fluid flow flowing through a thick-walled pipe of a high-pressure-side high-pressure pump outlet of a high-pressure pump designed to generate a pressure between 1000 and 6000 bar, comprising:

attaching the ultrasonic measuring device to an exterior of the thick-walled pipe;

passing a fluid stream through the thick-walled pipe;

measuring a flow velocity of the fluid stream through the thick-walled pipe; and transmitting the measured flow velocity to an evaluation unit;

wherein the ultrasonic measuring device is arranged externally on the thick-walled pipe of the high-pressure pump outlet, which pipe has a ratio of the internal diameter to the external diameter of 1:1.5 to 1:5, in such a way that this ultrasonic measuring device dynamically measures the flow speed of the fluid flow and transmits this measured flow speed as a measurement result to an evaluation unit to compute a present flow value and a flow control variable to be achieved from the measurement result.

* * * * *